Feb. 13, 1940.  P. R. TARR  2,190,553
PHOTOMETER FOR MEASURING EXPOSURES AND DENSITIES
Filed May 14, 1938
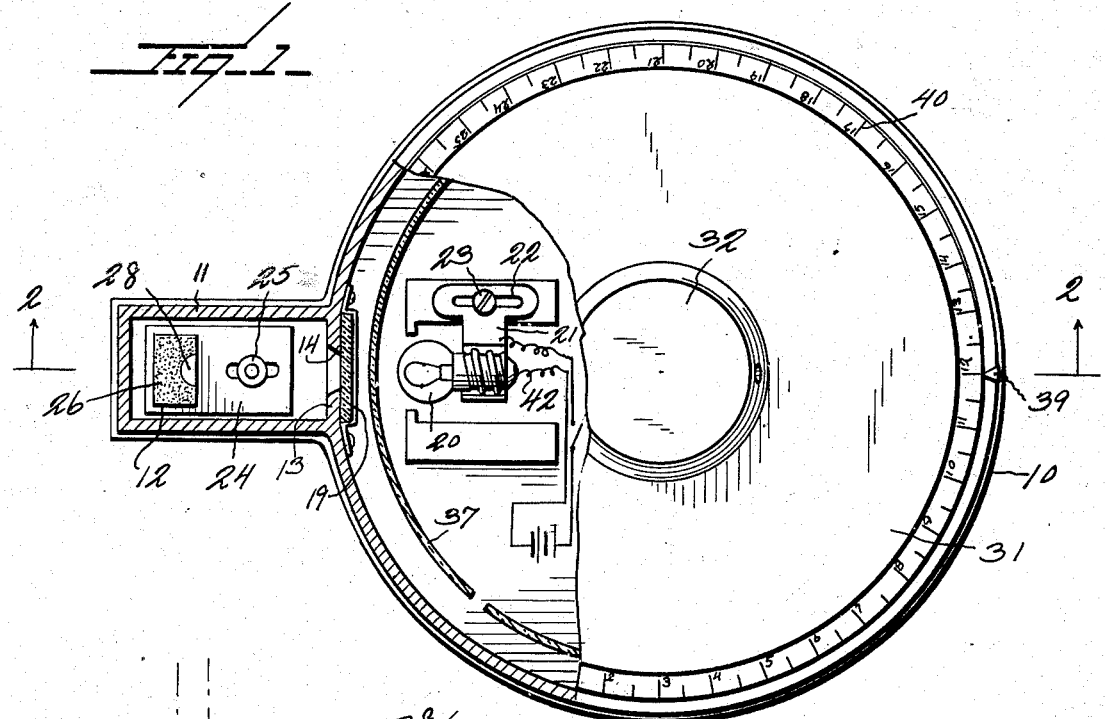
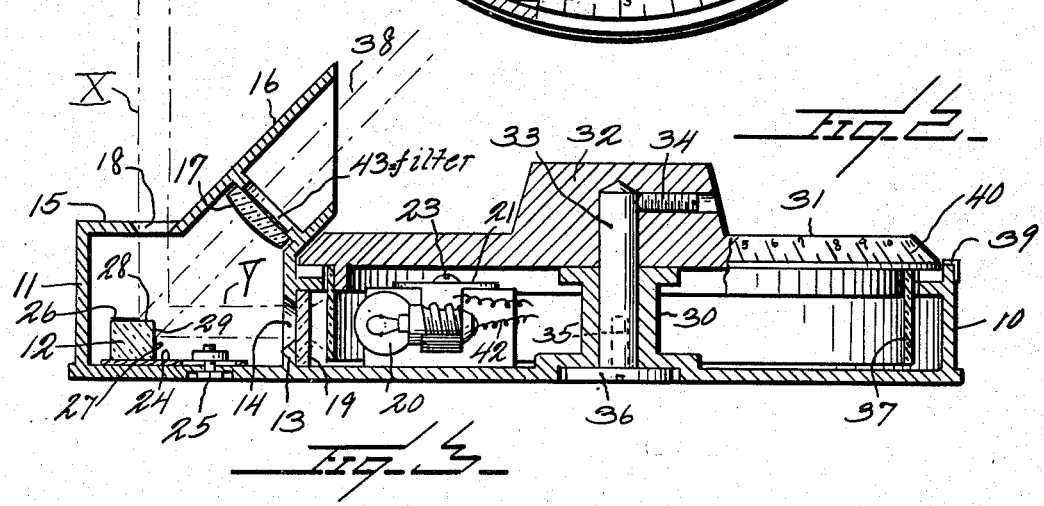
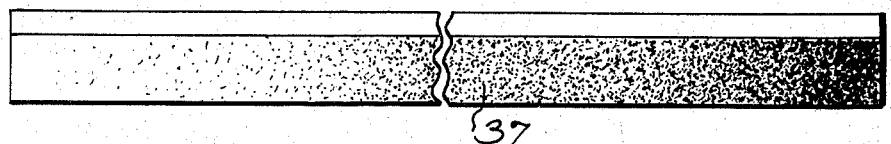
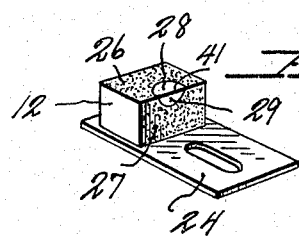
Inventor
Philip R. Tarr
By Watson E. Coleman
Attorney Patented Feb. 13, 1940

2,190,553

UNITED STATES PATENT OFFICE 2,190,553

PHOTOMETER FOR MEASURING EXPOSURES AND DENSITIES

Philip R. Tarr, Cuyahoga Falls, Ohio

Application May 14, 1938, Serial No. 208,000

5 Claims. (Cl. 88—23)

This invention relates to photometry and particularly to a photometer constructed with particular reference to its use in projection printing which is commonly known as "enlarging."

The general object of the invention is to provide a visual photometer particularly adapted for measuring and evaluating both exposure time and measuring and evaluating the density or contrast scale of a photographic negative.

There are numerous obstacles or difficulties in projection printing such, for instance, as the selection of the proper grade of sensitized material to suit the negative and the determination of the proper time of exposure, which varies with the grade or type of sensitized material. Such difficulties are well known to those acquainted with the art of projection printing, and a further object of the invention, therefore, is to provide a photometer which will overcome to a large degree these difficulties.

There are wide differences in sensitized materials for projection printing (these materials being usually sensitized paper but may be sensitized glass or other material of like character). Each manufacturer produces special materials for certain uses, each of which materials is different from the others as to its sensitivity to the action of light during exposure, exposure being defined as the intensity of light impinged upon the surface of the sensitized material multiplied by the time it is allowed to act. Since each photographic negative varies in density and each sensitized material for projection printing is different in its requirements as to exposure, it can be readily seen that unless accurate means is at hand for measuring the light intensity falling upon the sensitized media, said sensitized media will have to be exposed by means of guess and trial. This is a costly practice producing questionable results due to the fact that it is impractical to try more than a very few of the many available materials with each negative.

The density or contrast scale of a photographic negative refers to the relative amount of light-absorbing material present in various parts of the negative image. In reference to projecting printing, however, it is a common practice to evaluate the density scale of a negative in terms of "exposure scale" or the relative intensities of light transmitted through the various parts of the negative while as to the sensitive material upon which the projection print is made, its exposure scale refers to the relative exposures necessary to produce the faintest perceptible image and the blackest or darkest image possible.

It is essential, therefore, that the sensitized paper or other material be so chosen that its exposure scale matches that of the negative, otherwise either over-contrasting or flat contrastless prints will be obtained.

A further object of the present invention, therefore, is to overcome the difficulty of matching the paper and negative scales by providing means to measure the maximum and minimum light intensities of the projected images to thereby permit a paper having the proper exposure scale to be selected for use with that negative.

A still further object is to provide a photometer which may be also used in testing the exposure scale of a sensitized paper and may be used in determining the speed factor of the paper and further to provide a photometer which can be used for evaluating exposure and images on the ground glass of a camera where, as in microscopy of certain kinds, the spectral distribution of light is similar to the spectral sensibility of the eye, or in contact printing where the negative is placed in contact with the paper.

My invention is illustrated in the accompanying drawing wherein:

Fig. 1 is a top plan view of a photometer constructed in accordance with my invention.

Fig. 2 is a vertical section on the line 2—2 of Fig. 1.

Fig. 3 is an elevation of the absorption screen flattened out.

Fig. 4 is a perspective view of the comparison block and the slide upon which it is mounted.

Referring to the drawing, 10 designates generally the circular casing of the instrument which at one point is formed with a rectangular chamber 11 extending radially from the casing 10 and constituting a housing for a comparison block 12, which will be later described in detail. This housing is closed on three sides and on the fourth side by a wall 13 having an aperture 14 opening into the main casing 10. The top wall of the housing 11 has a horizontal portion 15 and inward of this horizontal portion there is an upwardly and centrally inclined hood 16 within which is disposed a viewing lens 17 which is focused upon the adjacent corner of the comparison block 12. The horizontal portion 15 of the top wall is formed with an aperture 18. This provides for the entrance of a beam of light from an outside source, this beam being designated X and this being a beam of light, the intensity of which is to be measured. The side wall, as before stated, has an aperture 14. These apertures 18 and 14 are so disposed that the beam X will impinge against the upper surface of the comparison block 12 at the upper inner corner thereof while a beam Y passing through the aperture 14 will impinge against the upper end of the vertical surface of the comparison block 12.

Just inward of the opening 14 there is provided a diffusing screen 19 of ground glass or translucent glass and a screen of neutral tint.

Within the casing 10 adjacent the screen 19 there is disposed a small electric bulb 20 mounted in a clamp 21, which may be of any suitable construction, which clamp is adjustable toward or from the screen 19 by means of a slot 22 through which passes an adjusting screw or set screw 23. Any other means for adjusting this lamp toward or from the comparison block 12 may be provided. The comparison block 12 is also mounted upon a slide 24 which is longitudinally slotted and which is held in adjusted position by the screw 25. The light comparison block has its upper face shielded from reflection as by a covering 26 and the inner face of this block is also shielded by a covering 27. These coverings 26 and 27 are cut away at 28 and 29, so as to provide two light-reflecting surfaces at right angles to each other. The light Y impinges directly upon the surface 29 while the light ray X impinges directly upon the surface 28.

The central portion of the casing 10 is provided with the upstanding tubular bearing 30. Operating over the upper open portion of the casing 10 is a dial 31 having a knob 32 whereby it may be rotated and supported upon a rotatable shaft 33 extending down through the tubular bearing 30, the dial and knob being held upon this shaft by means of a set screw 34. The lower end of the shaft 33 is engaged by a screw 35 having a relatively large head 36 disposed within a recess on the bottom of the casing 10. Carried by the dial and extending downward into the casing 10 is a continuously variable absorption screen 37 which has a relatively high degree of transparency at one point on the screen and a relatively high degree of opacity at what may be termed the other end of the screen. The light controlling or absorption screen 37 is arranged so as to control the light from the comparison lamp 20 through the diffusing screen 19, this ray of light from the comparison lamp in turn illuminating the surface 29 of comparison block 12 continuously as the dial 31 is rotated from one end of the screen 37 to the other and from full intensity at one end of the screen to the lowest visible intensity at the other end of the screen while the light intensity to be measured illuminates the surface 28 of the comparison block, both surfaces being visible along the axis 38 and being magnified by the lens 17. The dial 31 is provided with graduations conforming to some predetermined plan as to the light values transmitted to the comparison block 12, these graduations being read in connection with an index 39 carried on the wall of casing 10. Where the two surfaces 28 and 29 are equally illuminated, a "null" point is reached, this "null" point being obtained by rotating the dial 31 until the comparison surfaces are equally illuminated, reference being then made to the index point 39, reading the light value on the scale 40, these values having previously been obtained by calibration.

The dial 31 can be calibrated by using a light of known value to produce the beam X and varying the light intensity by moving the light source (not shown) axially along the beam X so as to produce varying intensities of light on the comparison surface 29 according to the inverse square law of light. At each desired change of intensity on the surface 29, the dial 31 may be rotated so that absorption screen 37 adjusts the light on surfaces 28 and 29 until they come to the same intensity when viewed along the optical axis 38, thereafter marking these units at the index point 39 so as to form the scale 40.

Referring again to the comparison block 12, this block is of white material and the faces 26 and 27 of the block are blackened out so that the semi-circular surfaces 28 and 29 are white and at right angles to each other, there being a sharply defined dividing line 41 at the intersection of these two surfaces.

In order to obtain accuracy in a photometer of this character, the voltage impressed upon the comparison standard lamp 20 through the leads 42 is to be adjusted so that the color of the filament in the lamp 20 produces a spectrum as similar as possible to that of the light to be measured. Where these conditions cannot be met, the eye may be somewhat assisted in making unity or "null" adjustments of light intensity on the surfaces 28 and 29 by viewing these surfaces through a blue or green-colored filter 43 on the upper side of the lens 16, or in any other convenient location along the spectral axis 38. While the use of a filter does not completely correct color difference, it does assist if the observer uses the unbalance or shadow location method of reading the photometer.

I do not wish to be limited to the particular character of the screen 37 which, as before stated, should vary very gradually in density from one end of the screen to the other. There are various methods of making a screen of this character. One is the provision of ruled lines running longitudinally along a transparent support as, for instance, a strip of Celluloid, the lines progressively becoming broader from one end to the other, thus reducing light transmission through the screen by means of changing the ratio of transparent to opaque area progressively and very gradually from one end of the screen 37 to the other.

It is known that the maximum sensitivity of photographic printing papers is in the blue-green end of the spectrum while the maximum sensitivity of the eye is in the yellow-orange region. However, through the choice of a proper comparison lamp, the ratio of blue-green to yellow-orange light can be made alike in the enlarging and photometric apparatus, and it so happens when using ordinary incandescent lamps at their normal voltage that a change of intensity through an absorption screen (holding the filament voltage constant), in the region of the eye's maximum sensibility effects a similar change in the blue-green region, therefore, proportionate comparisons may be made, using the eye to judge unity, that is, using the eye to judge when the two light surfaces 28 and 29 have the same value. The error due to displacement of the spectra involves a practically negligible correction when the device is to be used as now described. When this device is used for measuring both exposure and selecting the proper grade of paper to match the negative density scale in projection printing, the instrument is placed upon the easel of the projection printer and arranged so that light coming from the densest part of the negative falls on surface 28 of the comparison block 12 through the opening 18. The absorption screen 37 is then rotated by means of the knob 32 until the two surfaces 28 and 29 appear equally illuminated when observed through the hood 16 and lens 17. The dial indication is then read at the index 39 and this reading, being in terms of light intensity, can by means of a predetermined factor, be made to signify the proper exposure time for any sensitized photographic paper or any other sensitized media. By means of making a similar reading on the brightest portion of the projected image, the density scale of the negative can be determined and from this set of readings, a paper can be selected which has a fitting exposure scale to match the negative, this exposure scale having been determined for various papers by tests well known to those acquainted with the science of projection printing.

It will be seen that I have provided a portable instrument for hand-held use including a circular, varying density, light absorbing screen mounted upon the dial, the dial in turn being mounted upon a casing which includes a light source projecting light through the screen upon a comparison block and that the casing is provided with means for viewing the comparison block and comparing the light projected from the lamp within the casing with a beam of light from an outside source.

What is claimed is:

1. A photometer, including a flat circular casing having a bottom wall and a side wall and a radially offset housing forming part of the casing but separated from the body of the casing by the side wall, the housing having a top wall provided with a light receiving opening and the side wall of the casing having an aperture opening from the housing into the casing; a fixed light-comparison element disposed within the housing and having a white area receiving light from the first-named opening and a second white area joining the first-named area and extending in a plane perpendicular thereto and receiving light from the second-named opening; an electric lamp disposed within the casing and discharging a light beam through the second-named opening onto the second-named white area, a dial mounted for rotation upon the casing and having graduations upon its rim, an index mark on the casing with relation to which the graduations are correlated, a light absorption screen carried by and turnable with the dial and graduated from relative transparency to relative opacity and depending into said casing in the path of said light beam, and means carried by the housing for sighting both of said areas at one time to compare the relative illumination thereof.

2. A photometer, including a flat circular casing, a dial mounted for rotation upon one side of the casing, an annular absorption screen carried by the dial and rotatable therewith in the casing, a lamp disposed within the casing in the area defined by the screen and projecting a beam of light through the absorption screen, a comparison block outside said area and having two faces at right angles to each other upon one of which faces the light from said lamp impinges, means for admitting light from an outside source along a path parallel to the said one face of said block and onto the other face of the comparison block, and means including a lens having its optical axis coincident with the junction between the two faces of the block whereby the two faces may be viewed and comparison between the light received thereon made.

3. A photometer, comprising a flat circular casing having a bottom wall and a side wall, a rotary dial constituting a top wall and having graduations about its rim, an annular band secured along one edge to the inner side of the dial and constituting an absorption screen, a housing extending radially from the casing side wall, the side wall having a light window opening from the casing into the housing, the housing having a top wall provided with a light window, a comparison block fixed in the housing and having two perpendicular faces each facing a light window, means within the area defined by said band for directing a light beam through the band and through said first window toward the block face in line therewith, an index on the casing wall correlated with said graduations, a sight tube opening through the top of said housing and directed thereinto toward the edge of the block formed at the intersection of said faces, and a lens in said tube, the optical axis of which intersects said edge.

4. A photometer, comprising a flat circular casing having a bottom wall and a side wall, a rotary dial constituting a top wall and having graduations about its rim, an annular band secured along one edge to the inner sides of the dial and constituting an absorption screen, a housing extending radially from the casing side wall, the side wall having a light window opening from the casing into the housing, the housing having a top wall provided with a light window, a comparison block fixed in the housing and having two perpendicular faces each facing a light window, means within the area defined by said band for directing a light beam through the band and through said first window toward the block face in line therewith, an index on the casing wall correlated with said graduations, a sight tube opening through the top of said housing and directed thereinto toward the edge of the block formed at the intersection of said faces, and a lens in said tube, the optical axis of which intersects said edge, said block being mounted in the housing for adjustable movement toward and away from the first-mentioned light window.

5. A photometer, comprising a flat circular casing having a bottom wall and a side wall, a rotary dial constituting a top wall and having graduations about its rim, an annular band secured along one edge to the inner side of the dial and constituting an absorption screen, a housing extending radially from the casing side wall, the side wall having a light window opening from the casing into the housing, the housing having a top wall provided with a light window, a comparison block fixed in the housing and having two perpendicular faces each facing a light window, means within the area defined by said band for directing a light beam through the band and through said first window toward the block face in line therewith, an index on the casing wall correlated with said graduations, a sight tube opening through the top of said housing and directed thereinto toward the edge of the block formed at the intersection of said faces, a lens in said tube, the optical axis of which intersects said edge, and a color filter overlying said lens.

PHILIP R. TARR.